Nov. 11, 1952  B. F. SHEPHERD  2,617,631
ROCK DRILLING TOOL
Filed Oct. 28, 1948
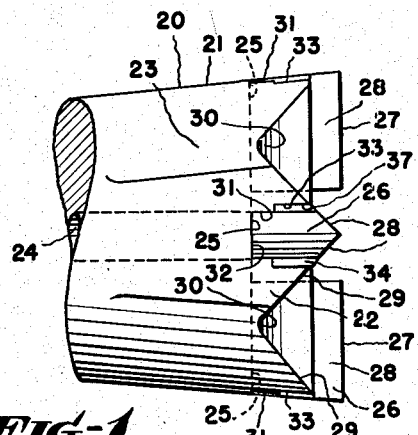
FIG.-1.
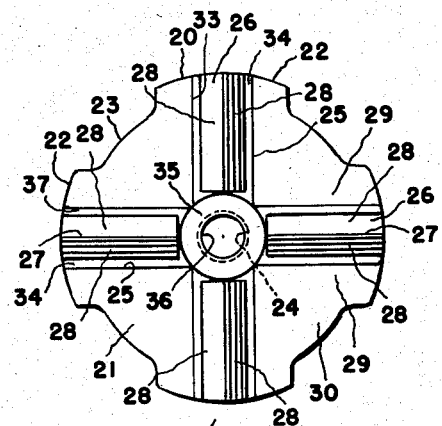
FIG.-2.
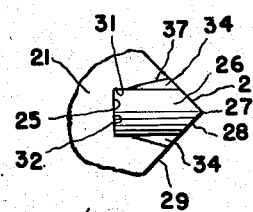
FIG.-3.
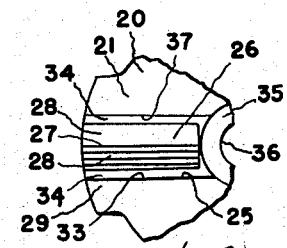
FIG.-4.
FIG.-5.
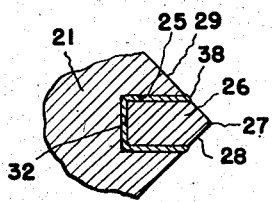
FIG.-6.
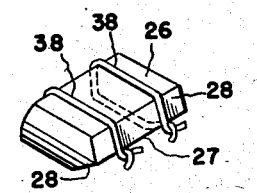
FIG.-7.
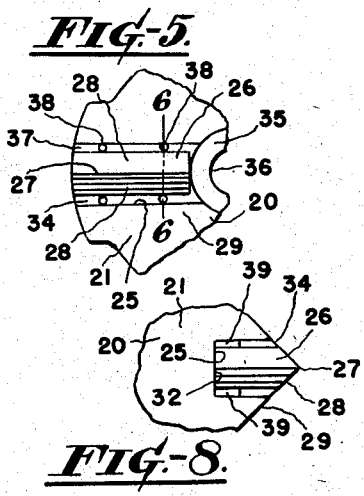
FIG.-8.
INVENTOR
BENJAMIN F. SHEPHERD
BY
HIS ATTORNEY.

Patented Nov. 11, 1952

2,617,631

UNITED STATES PATENT OFFICE 2,617,631

ROCK DRILLING TOOL

Benjamin F. Shepherd, Phillipsburg, N. J., assignor to Ingersoll-Rand Company, New York, N. Y., a corporation of New Jersey Application October 28, 1948, Serial No. 57,000

2 Claims. (Cl. 255—64)

This invention relates to cutting implements, and more particularly to a rock drilling tool having cutting elements of hard metal embedded in a body of relatively ductile and less costly material than the cutting elements and suitably connected thereto by a brazed joint.

A difficulty frequently encountered in the manufacture of tools of this type is that, during the brazing operation, the insert or cutter becomes displaced from its true central position within the slot accommodating it. In consequence, the brazed joint often becomes unnecessarily wide on one side of the cutter and so thin on the opposite side that it consists of no more than the reaction products of the brazing and adjacent material which, as is well known, lack the qualities of ductility and resistance to fatigue necessary to withstand the severe shocks incident to drilling and disintegrate rapidly. In many instances, after the brazed joint has become thus impaired, the remaining portion of the joint will also soon fail and permit the cutter to drop out of the body, thus greatly diminishing the cutting ability of the tool.

It is accordingly an object of the invention to improve the construction of rock drilling tools in order to make them more durable and efficient.

A further object is to assure metallic bonding connections of substantially equal thickness between the body and the opposed sides of the cutter.

Still another object is to assure the presence of substantially equal zones of ductility and fatigue resistance in all of the metallic bonding connections securing the cutter to the body.

Other objects will be in part obvious and in part pointed out hereinafter.

In the drawings accompanying this specification and in which similar reference numerals refer to similar parts, Figure 1 is a longitudinal side view of a rock drilling tool constructed in accordance with the practice of the invention, Figure 2 is an end view of the tool, Figure 3 is a longitudinal end view of a portion of a cutting wing of a drilling tool showing a modified form of the invention, Figure 4 is an end view of the form of the invention shown in Figure 3, Figure 5 is a view similar to Figure 4 showing still another modified form of the invention, Figure 6 is a transverse view taken through Figure 5 on the line 6—6, Figure 7 is a perspective view of a detail, and Figure 8 is a view similar to Figure 3 showing another modified form of the invention.

Referring more particularly to the drawings and at first to the form of the invention shown in Figures 1 and 2, 20 designates a drilling tool constructed in accordance with the practice of the invention and comprising a body 21 which is shown as being of frusto-conical shape and may be an integral portion of a drill rod or a separate member adapted for attachment to a drill rod.

The large end of the body 21 is of cruciform shape having four equi-angularly spaced wings 22 separated by depressions or spaces 23 that extend longitudinally of the body for the passage of cuttings from the hole being drilled. The body has a passageway 24 for conveying cleansing fluid to the working surface, and in the large end of the body are radial slots 25 that extend from the passageway 24 to the peripheral surfaces of the wings 22 to accommodate cutters 26 the outer ends of which preferably lie flush with the peripheral surfaces of the wings 22.

The cutters 26 are constructed of hard material, as for example tungsten carbide. Their cutting edges 27 are defined by the usual inclined surfaces 28 that correspond with the slope of surfaces 29 extending along the sides of the slots to define depressions 30 in the end of the body for the passage of cuttings from the bottom of a drill hole to the spaces 23.

The cutters 26 are shown as being of uniform height and width throughout their lengths and, in accordance with the practice of the invention, the portion 31 of the slot 25 adjacent the bottom surface 32 of the slot is of substantially the same width as the cutter 26, the cutter preferably having only a slide fit in this portion of the slot. The remaining portion of the slot, that is to say, the portion 33 which extends from the portion 31 to the end surface of the tool, is of greater width than the portion 31 as, say, .0025 to .003 on each side of the slot, to receive brazed joints 34 that connect the cutter to the body. The brazing material preferably also extends along the inner end of each cutter to secure to the body an abutment member 35 for the inner ends of the cutters, there being an aperture 36 in the member 35 to provide an outlet for the passageway 24.

In the form of the invention shown in Figures 3 and 4 the portion 31 of the slot 25 is also of substantially the same width as the cutter 26 to centralize the cutter within the slot, but the walls 37 of the slot extending from the portion 31 to the end surface of the body 21 are inclined so that the brazed joints 34 connecting the cutter to the body are of wedge shape. In this form of the invention, the brazed joints also extend along the entire length and around the inner end of the cutter 26 and serve to secure the abutment member 35 to the body 21.

In the form of the invention illustrated in Figures 5 to 7 inclusive, the slot 25 is of uniform width from its bottom surface 32 to the end surface of the body 21 and is of greater width than the cutter 26 which is centralized in the slot by spacers 38. The spacers are preferably in the form of wires which encircle the cutter 26 and may, as shown in Figure 7, be wound around the cutter to be inserted therewith into the slot. These spacers are of a diameter substantially equal to the desired thickness of the metallic bonding connection 34 and are bonded to the assembly. Their ends are twisted together over the cutting edge of the cutter and may, for the sake of appearance, be severed from the portions embedded in the metallic bonding connection upon completion of the brazing operation.

In the modified form of the invention shown in Figure 8, the slot 25 is also of uniform and greater width than the cutter 26 which is held in suitably spaced relation with respect to the walls of the slot by shims 39 seating at one edge against the bottom surfaces 32 of the slot. The remaining portions of the spaces between the cutter 26 and the walls of the slot are filled with the brazing material 34 which also secures the shims 39 fixedly to the assembly.

In practice, the present invention has been found to greatly expedite the operation of brazing the cutters to the body. This is due to the facts that the cutters may be conveniently and quickly centralized in the slots and that they will remain thus throughout the brazing operation. In this way, the brazed joints at the opposite sides of a cutter will be of substantially the same thickness and will possess the ductility and resistance to fatigue necessary to maintain the joint intact under the severe battering to which tools of this type are subjected.

I claim:

1. A drilling tool, comprising a body, a slot in the body having a portion of reduced width at the bottom thereof, a cutter in the slot having a slide fit in the portion of reduced width for centralizing the cutter in the slot, and metallic bonding connections in the slot to secure the cutter to the body.

2. A drilling tool comprising a body, a slot in the body having a portion of reduced width for centralizing the container in the slot, and metallic bonding connections in the slot to secure the container to the body, the slot having divergent walls extending outwardly from the portion of reduced width.

BENJAMIN F. SHEPHERD

REFERENCES CITED

The following references are of record in the file of this patent:

UNITED STATES PATENTS

| Number | Name | Date |
| --- | --- | --- |
| 821,202 | Thomas | May 22, 1906 |
| 874,455 | Swanton et al. | Dec. 24, 1907 |
| 1,887,373 | Emmons et al. | Nov. 8, 1932 |
| 1,899,458 | Erickson | Feb. 28, 1933 |
| 2,018,073 | Laise | Oct. 22, 1935 |
| 2,019,934 | Schroter et al. | Nov. 5, 1935 |
| 2,022,194 | Galvin | Nov. 26, 1935 |
| 2,101,376 | Voigtlander | Dec. 7, 1937 |
| 2,101,865 | McCallum | Dec. 14, 1937 |
| 2,252,745 | Williams | Aug. 19, 1941 |
| 2,255,301 | Thompson | Sept. 9, 1941 |
| 2,502,128 | Curtis | Mar. 28, 1950 |

FOREIGN PATENTS

| Number | Country | Date |
| --- | --- | --- |
| 148,826 | Switzerland | Oct. 16, 1931 |